United States Patent [19]

Rios

[11] 3,954,037

[45] May 4, 1976

[54] LINEAR MOTOR BAND SAW

[75] Inventor: Guillermo Baez Rios, Mexico City, Mexico

[73] Assignee: Emilio Retana Rodriguez, Mexico City, Mexico

[22] Filed: July 9, 1975

[21] Appl. No.: 594,540

[52] U.S. Cl. ................................. 83/794; 83/788; 83/523; 83/577; 83/661
[51] Int. Cl.² ........................................ B27B 13/00
[58] Field of Search ............ 83/794, 788, 523, 577, 83/661; 318/195, 135

[56] References Cited
UNITED STATES PATENTS

| | | | |
|---|---|---|---|
| 2,514,116 | 4/1950 | Baker | 83/577 X |
| 3,259,004 | 7/1966 | Chisholm | 83/788 X |
| 3,496,817 | 2/1970 | Staats et al. | 83/577 X |
| 3,797,339 | 3/1974 | Pape et al. | 83/577 X |

Primary Examiner—J. M. Meister
Attorney, Agent, or Firm—Kinzer, Plyer, Dorn & McEachran

[57] ABSTRACT

A band saw in which a continuous, electrically conductive band having cutting teeth along one edge is mounted about spaced apart support pulleys. A linear induction motor drives the band about the pulleys; the motor has a stationary induction field system as the primary driving element of the motor, mounted in operative relation to the band to drive it about the pulleys, and the band itself constitutes the motor armature.

13 Claims, 6 Drawing Figures

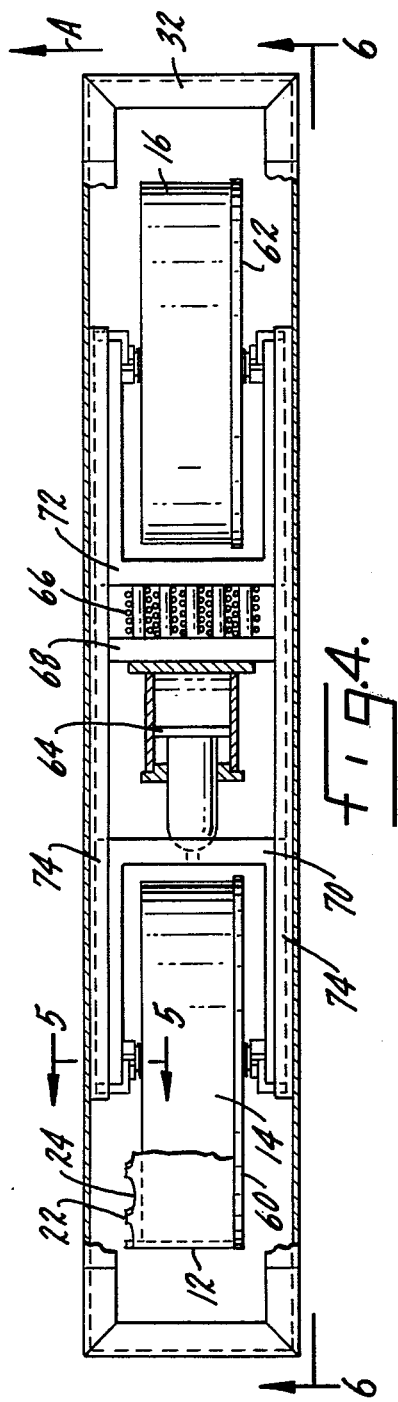
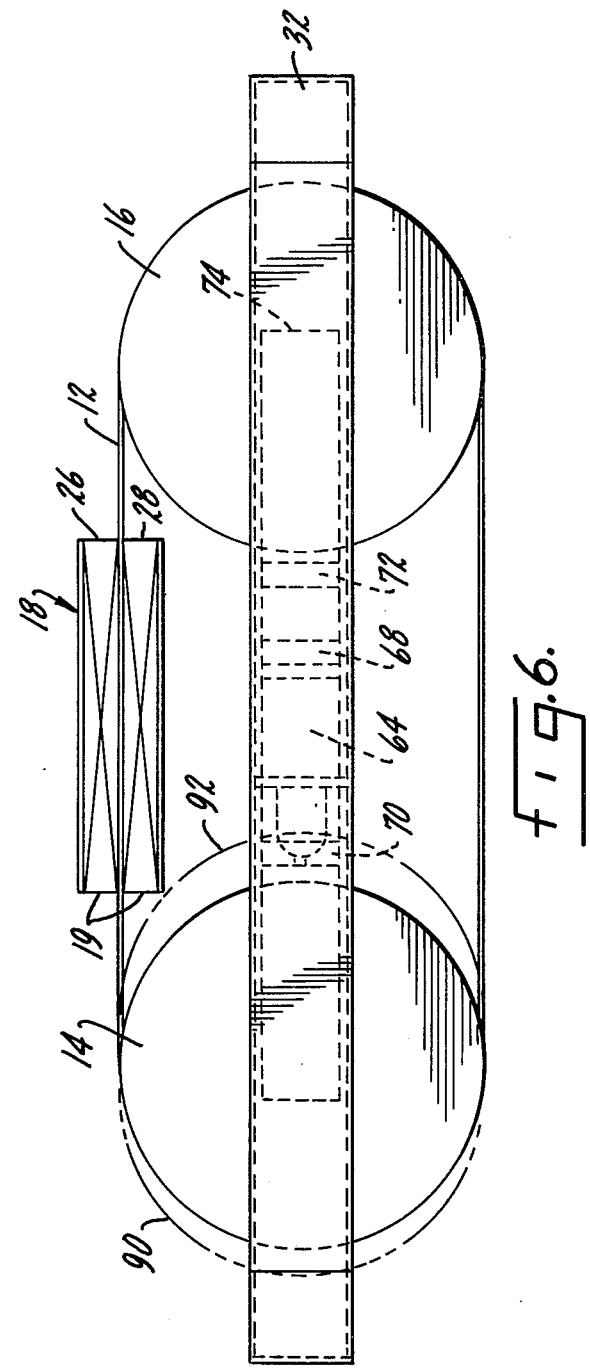

LINEAR MOTOR BAND SAW

BACKGROUND OF THE INVENTION

Continuous band-type power saws are in widespread use in the lumber and woodworking industry for many applications. For example, large saw mills use such band saws, pushing the logs lengthwise through the bands to obtain generally flatsided boards, planks, or other shapes.

Band saws used in saw mill applications usually operate at speeds varying generally from about 5,000 feet per minute to 10,000 feet per minute, according to the conditions of a particular application, such as the size of the saw and hardness of the wood being cut. To furnish the power required for cutting at such high speeds, the bands are customarily driven by large motor driven pulleys so that sufficient traction is obtained between the drive pulley and the band to prevent slippage under load conditions. Typical pulleys of the band saws found in saw mills have diameters on the order of six to ten feet. Because of the large mass inherent in pulleys of such large diameters, the rotational inertia of the pulleys resists acceleration and deceleration, requiring considerable time to get the pulleys up to speed and to stop them. The large diameter pulleys, of course, necessitate that the whole band saw machine be very large, which may be a distinct disadvantage in certain applications, especially when it is desired to make the saw mobile, or trailer-mounted for use in forests. One such application, in which a relatively small, light and mobile band saw is desirable is the shaping of trees for railroad ties which is commonly performed near the site where the trees are felled, often in tropical and subtropical locations where transportation of large heavy equipment may be difficult or even impossible.

Continuous band saws generally employ some type of transmission means, be it chains, belts, or gears, between the motor and drive pulley to transmit the rotary motion of the motor to that pulley. Such transmission means are subject to wear and require periodic servicing, both of which contribute to the expense and possibly downtime of the band saw. Even if the drive pulley is mounted directly on the motor shaft, however, the frictional drive contact between the pulley and band must be maintained in order to impart the rotary motion of the drive pulley to the band.

Band saws are also used in many applications other than saw mills, as in metalworking and woodworking shops and at construction sites. The difficulties and problems presented by a large band saw intended for mill use recur in the smaller saws used for these other applications, though on a somewhat reduced scale.

STATEMENT OF THE INVENTION

It is a primary object of the present invention, therefore, to provide a new and improved band saw in which the saw band itself is a part of the power source (motor) of the machine, thereby to provide an efficient and effective means for activating and controlling movement of the band without requiring a critical level of frictional contact between a pulley and the band.

A further object of the invention is to provide a new and improved band saw which may operate effectively with pulleys of minimal size to thereby reduce the overall size of the band saw machine and to make possible the construction of a relatively small, light and mobile band saw.

A specific object of the invention is to provide a new and improved band saw in which the band is driven by a linear induction motor having a stationary induction field system as the primary driving element which is mounted in operative relation to the band to drive it about the pulleys, with the band itself being the secondary driven element (armature) of the linear induction motor.

A related object of the invention is to provide a new and improved linear motor driven band saw having means for adjusting the tension in the band and maintaining that tension generally constant regardless of minor changes in band length due to stretching, temperature changes, and like factors.

A further specific object of the invention is to provide a new and improved linear motor driven band saw having adjustable expansion means and spring means interposed between the band support pulleys to urge them apart.

Accordingly, the invention pertains to a band saw in which a continuous, electrically conductive band carrying cutting teeth along at least one edge is the secondary driven element of a linear induction motor. The band is mounted for continuous motion in either of opposite directions about a pair of spaced apart support pulleys. The primary driving element of the linear induction motor is a stationary induction field system mounted in operative relation to the saw band, which comprises the secondary element (armature) of the motor, to drive the band about the pulleys. In one preferred construction, the stationary induction field system comprises a pair of field structures opposingly mounted so as to provide an air gap through which the conductive band extends; the band is driven by fields induced across the field structures. Another preferred construction includes means for adjusting and maintaining tension in the band, using adjustable expansion means and spring means interposed between the support pulleys to urge them apart.

BRIEF DESCRIPTION OF THE DRAWINGS

FIG. 4 is a plan view of the carriage frame of the band saw of FIG. 1;

FIG. 6 is an elevation view taken approximately along line 6—6 in FIG. 4.

DESCRIPTION OF THE PREFERRED EMBODIMENTS

Figure 1:
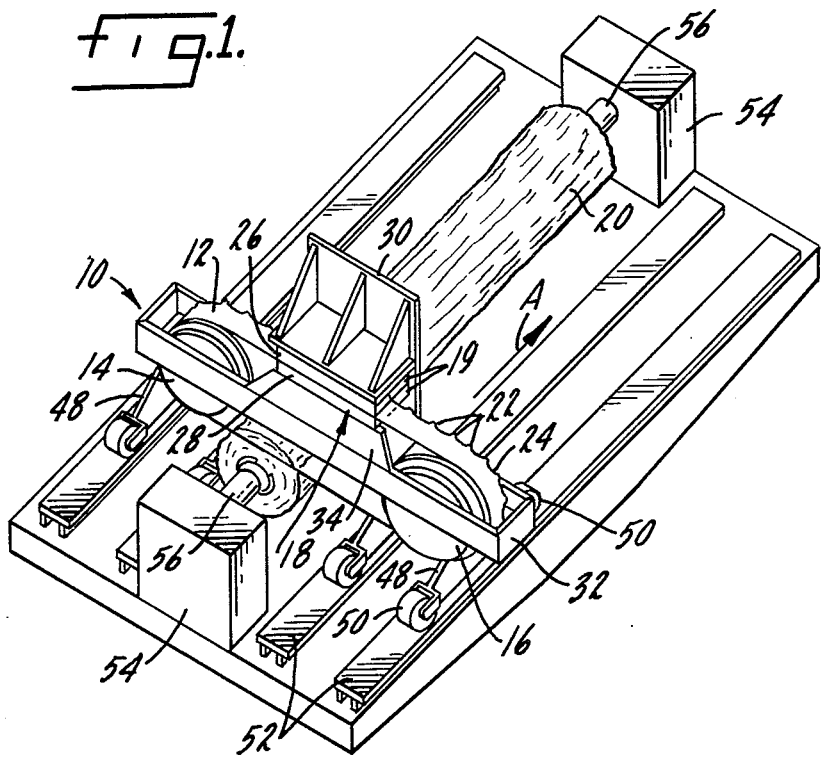
FIG. 1 is a perspective view of a band saw incorporating the linear motor driven band, constructed in accordance with one embodiment of the invention.

FIG. 1 illustrates a band saw 10 constructed in accordance with one preferred embodiment of the invention. Band saw 10 comprises a continuous saw band 12 which is mounted about a pair of support pulleys 14 and 16. The band 12 is driven about the pulleys by a linear induction motor 18. The primary driving element of the motor 18 is a stationary induction field system 19 which is mounted in operative relation to the band to drive it about the pulleys. Band 12 itself constitutes the secondary driven element or armature of the linear induction motor 18. Pulleys 14 and 16 are generally free wheeling support members, so that the motion of the band 12 about the pulleys 14 and 16 is controlled by the stationary induction field system 19 which can stop, start and drive the band continuously in either direction.

The stationary induction field system 19 closely overlies one of the two lengths of the band 12 which extend between the pulleys 14 and 16. The other length of the band performs the actual cutting function of band saw 10 by presenting to a workpiece 20 a plurality of cutting teeth 22. The cutting teeth 22 are carried along one edge 24 of the band 12. The linear induction motor 18, including the field structure 19 and the band 12, and the pulleys 14 and 16 are all suitably mounted for movement in the direction of the arrow A to cut stationary workpiece 20.

Figure 2:
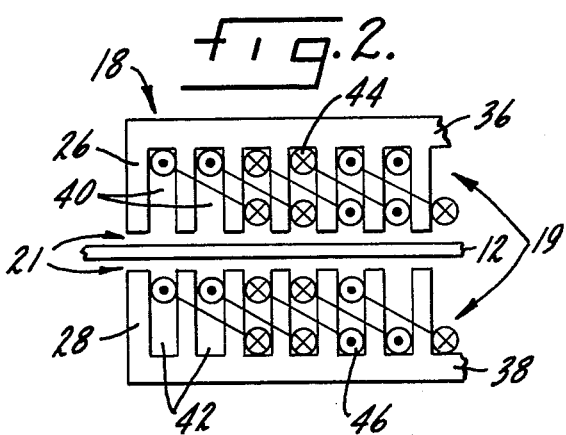
FIG. 2 is a schematic illustration of the stationary induction field system of a double-sided linear induction motor which may be used in the band saw of FIG. 1.

Stationary induction field system 19 of motor 18, in the embodiment shown in FIGS. 1 and 2, is that of a double-sided flat linear induction motor. It comprises a pair of flat stators or field structures 26 and 28 oppposingly mounted so as to provide an air gap 21 (see FIG. 2) between them through which a flat armature, in this case the continuous band 12, is inserted. Field structure 26 is supported directly above band 12 by a stator support frame 30 which in turn is carried on a carriage frame 32 which is separately described hereinbelow. Likewise, field structure 28 is supported directly below field structure 26 and band 12 by the stator support frame 30 on one side and on the other by a stator support member 34 which is also carried on carriage frame 32. Any suitable support means for the field structures would suffice so long as it properly positions the field structures in aligned, closely spaced opposing positions along a length of the continuous band 12 and so long as it is of sufficient strength to resist the forces applied to the band to drive it through its cutting motion.

The basic concept and principle of operation of a linear induction motor is described in an article by Wm. J. Adams entitled "Linear-Motor Actuators; Long Motions at Uniform Speeds", Modern Material Handling, Vol. 26, No. 1, Jan. 1971, pages 38–41. Generally, field structures 26 and 28 are a pair of opposing coil assemblies much like flattened-out versions of the stator windings of a conventional rotary motor. As alternating current is applied to the field structures, a field is induced in the armature or cutting band 12, causing the band and the field structures to repel one another. The induction force thus developed between the band and field structures is directed tangential to the air gap and is therefore in the nature of a shearing stress. Since the stationary induction field system 19 is fixed relative to carriage frame 32, band 12, which is free to move, provides the motor's linear motor. Thus, in the linear induction motor of the present invention, the band 12 itself becomes the equivalent of the rotor in a conventional motor, and is driven directly by the induction forces or fields established across the gap 21 between the stationary field structures 26 and 28.

FIG. 2 is a schematic illustration of a typical double-sided stationary induction field system. Each field structure 26 and 28 comprises a primary iron core, 36 and 38 respectively, each having a plurality of open ended transverse slots 40 and 42. The double-sided linear induction motor shown has a three-phase primary winding with conductors such as 44 and 46 inserted in the core slots. Each field structure thus comprises a plurality of poles, groups of which are sequentially energized by multi-phase electrical current, with each group connected in parallel with other such groups of poles. This contrasts with the series connection in which all of the groups of poles of each phase are connected in series so there is only one circuit within each phase. In the embodiment of FIG. 1, it is preferred that the stationary induction field systems be operable from electric current having an alternating frequency higher than 60 cycles per second.

It is to be understood that although a double-sided linear induction motor has been shown in FIGS. 1 and 2, a single-sided motor could likewise be installed in other embodiments of the present invention. The field structure of such a motor would be essentially identical to either of the field structures 26 or 28 discussed above. Perhaps the principal difference is that with a single-sided field structure, the armature (band 12) must be backed by a magnetic material, the armature's iron keeper. In the double-sided motor, the magnetic backing is not required since the iron core of the opposite field structure performs the same function.

Although either type of linear induction motor may be suitable for various applications, the double-sided version is preferred since it naturally has a larger output than the single-sided type and the forces of attraction or repulsion between the primary and secondary sides is much smaller in the double-sided type, wherein no magnetic keeper is needed. Further advantages are that bearing losses are minimized and a smaller gap is permitted between the motor stator and armature, which increases the motor efficiency.

In either type of field structure for the linear motor 18, a reversal of the direction of thrust is possible so as to provide a capability for driving the band 12 in either of opposite directions. The force, which remains equal regardless of direction, may be reversed by appropriate switching for the field conductors 44,46. In units powered by three-phase current, a reversal of any two leads causes the phase of certain poles to be interchanged with others, which effectively reverses the direction of the induction force.

Electrical reversability is further advantageous in that it provides a braking function for the saw during operation with no additional mechanical equipment. Electrical reversing of the linear motor as it is driving the band in one direction simultaneously eliminates the induction force acting in the direction of motion and exerts an oppositely directed force directly on the moving band to retard its motion.

Referring again to FIG. 1, carriage frame 32, which is the structural base for the pulleys 14 and 16 and the linear induction motor 18, is itself supported by a plurality of guide members 48. These guide members 48 span the width of the carriage frame generally normal to the center line of band 12 and extend downwardly therefrom to form generally stable foot members each carrying a pair of spaced-apart wheels 50. Together, the carriage frame 32 and the wheeled guide members 48 constitute a carriage on which the stationary induction field system, support pulleys and band, are mounted. Each of the guide members 48 is supported by and aligned along one of a series of tracks 52 to provide a smooth running surface along which the carriage may be reciprocated. It is to be understood that the exact design of the guide members 48 and tracks 52 is not critical; rather, any suitable guide means capable of supporting the carriage frame, bracing it to prevent rotation, and guiding it reciprocally over a workpiece will suffice. For example, guide members having flanged wheels movable along tracks may be provided, or the carriage frame may even be suspended from an overhead frame.

To position the workpiece 20 properly relative to the cutting band 12, a fixture is provided which is capable of holding and positioning the particular type of workpiece to be cut. In the embodiment of FIG. 1, which is designed for shaping logs, the fixture comprises a pair of mechanisms 54 having protrusions 56 for engaging the ends of the log or other workpiece 20 so as to rigidly hold the log during the sawing operation and rotate the log through 90° after each cut to position the log for sawing each of four sides. The particular fixture construction employed is not critical to the present invention, and may be modified for operations of band saws of various sizes and types. For example, in small metal cutting operations, it may be desirable to have the support pulleys spaced vertically and the workpiece movable relative to a cutting band held in a fixed location.

Regardless of the particular application for which the band saw is constructed, the type of teeth used on conventional band saws are generally suitable for use on the band 12. Teeth may be welded, brazed or otherwise fixedly mounted along one edge of band 12. The teeth may be formed integral with the band. However, it is generally preferable to form the teeth of a high temperature alloy having significant work-hardening properties, which properties would be undesirable for the flexible band itself.

Figure 3:
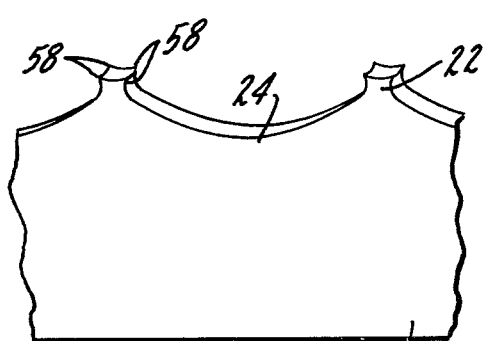
FIG. 3 is a gragmentary perspective view of one form of saw band which may be used in the machine of FIG. 1.

One type of saw tooth that may be most advantageously used in the linear motor powered band saw of the present invention is shown in FIG. 3. The tooth shown is the subject of my co-pending U.S. Pat. application, Ser. No. 567,883 filed Apr. 14, 1975. Teeth 22 may be welded or otherwise suitably attached and properly spaced along the edge 24 of the band.

This tooth construction is reversible in that it has four symmetrical cutting points 58, two at each end of the tooth, and is self-sharpening in that the trailing points sharpen as the leading points cut. Accordingly, a linear induction motor which is easily reversed and operable in both directions is an ideal drive means for a band carrying such teeth.

Band 12 has its own criteria for the material from which it is to be constructed. It is desirable that it have a high tensile strength and be flexible enough to be continuously cycled about pulleys 14 and 16. It should also be a material of high electrical conductivity since the band itself is the armature of the linear induction motor which drives the band saw. It is further desirable that the band be substantially non-magnetic, so as not to be attracted or repelled into engagement with either of field structures 26 or 28. Certain types of beryllium copper (e.g., Brush Alloy 10 HTC) have been found to be particularly suitable as band materials.

Referring to FIGS. 1 and 4, since band 12 carries teeth along only the one edge 24, pulleys 14 and 16 are provided with single flanges 60 and 62 respectively for retaining band 12 on the pulleys as the workpiece is cut by movement of the carriage in the direction of arrow A; other suitable means of maintaining the pulley in its proper positional relationship along the peripheral surfaces of pulleys 14 and 16 may be substituted for flanges 60 and 62 as shown.

Note that, in certain applications, it may be desirable to provide a band having teeth carried along both edges so that the saw may perform its cutting function as it is moved in each of two opposed directions relative to the workpiece. In such a case, it may be desirable to have flanges along both edges of the peripheral surfaces of the pulleys so as to form a slot with a bearing surface opposing that edge of the band which is opposite to the direction of motion when the band is travelling in either direction.

In order to maintain the air gap 21 between the band 12 and field structures 26 and 28, which is important for the efficient operation of the linear induction motor 18, the band must be held in tension, thus precluding deflection of that portion of the band which passes between the field structures. Tension in the band 12 is also required for maintaining a straight and effective cutting edge on that length of band 12 which is opposite the induction field system 18, this being the lower portion of the band as seen in FIGS. 1 and 6. To accomplish this, carriage frame 32 is provided with tension means (FIGS. 4 and 6) for adjusting and maintaining tension in the band. The tension means comprises an adjustable expansion means 64 and spring means 66 interposed between the pulleys 14 and 16 to urge the pulleys away from each other. In the embodiment shown, the adjustable expansion means 64 is a hydraulic jack acting against a fixed carriage frame crossbar 68 in one direction and in the other against a pulley support frame 70 which is slidably mounted in the frame 32. The spring means 66 is shown as a plurality of laterally spaced helical springs interposed between the crossbar 68 and a second slidably mounted pulley support frame 72.

Figure 5:
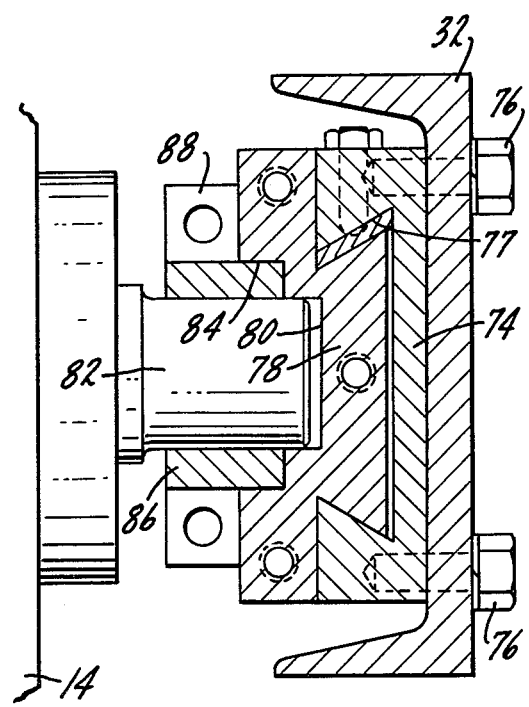
FIG. 5 is a section view taken approximately along line 5—5 in FIG. 4.

The structure of the pulley support frame 70 and the manner in which it is mounted on the carriage frame 32 are shown best in FIG. 5; support frame 72 is similar and hence is not shown in detail. Carriage frame 32 is essentially a rectangular frame, the side walls of which are channel shaped for structural reinforcement. Rigidly affixed to the inner surfaces of the longer sidewalls of carriage frame 32 are two elongated sleeve members 74. The sleeve members may be attached to the carriage frame 32 by bolts 76 or other suitable means. The inner or opposing faces of sleeve members 74 are provided with elongated slots or mortises 77 which act as tracks for supporting the pulley support frame 70.

Pulley support frame 70 (FIG. 4) is a generally U-shaped member, the legs of which are provided with outwardly extending flared tenons 78 (FIG. 5) for slidingly supporting the pulley support frame 70 within the sleeve members 74. On the opposite or inner surfaces of the legs of the pulley support frame, adjacent its free leg ends, aligned bores 80 are formed for receiving and supporting the ends of pulley axle 82. A wider annular recess or bore 84 may be formed in alignment with bore 80 for receiving a portion of an axle retainer ring 86 which is effective to fix the lateral position of pulley axle 82 when compressed by means of clamp 88. Pulley 14 is mounted with suitable bearing means about axle 82 to rotate thereabout with minimal friction.

Thus, pulley support frame 70 is slidable toward and away from pulley support frame 72 by means of its dovetailed connections to the carriage frame. Pulley support frame 72 may be similarly constructed and slidable within the carriage frame, or could be fixed relative to the carriage frame. Where both pulley support frames are slidable within the carriage frame, the carriage frame crossbar 68 may be ridgily fixed relative to the frame side walls. If pulley support frame 72 is fixed in position, on the other hand, carriage frame crossbar 68 may be free to slide longitudinally with respect to the carriage frame sidewalls. The important point is that at least one of the pulleys be movable toward and away from the other so that both the adjustable expansion means 64 and the spring means 66 are effective to apply a tensile load to the band engaged about both pulleys.

Pulley support frame 70 may be slidable, for example, to position pulley 14 longitudinally within a range defined by dotted line positions 90 and 92 as shown in FIG. 6. Dotted line position 90 indicates the full extent of separation between the pulleys allowed by a band in tension. Dotted line position 92 on the other hand, indicates that position at which hydraulic jack 64 is fully compressed, spring 66 is relaxed and band 12 is generally freely hung about the pulleys. As hydraulic jack 64 is extended to urge the pulley support frames 70,72 in opposing directions, pulley support frame 70 moves from dotted line position 92 to dotted line position 90, at which point any further expansion of hydraulic jack 64 is absorbed by compression of spring 66. Thus the hydraulic jack may be expanded to tighten the band to a desired tension and the compressed springs are then effective to maintain that tension generally constant in spite of minor changes in band length due to stretching and thermal expansion.

Thus, there has been shown and described a new and improved band saw in which the cutting band itself is the armature of a linear induction motor which drives the band about its pulleys. By eliminating the use of rotary electric motors and the conventional transmission means incident thereto, the present invention improves the efficiency of the power coupling to the cutting band, since the induction forces of the motor act directly on the band itself, which constitutes the armature of the motor. The pulleys about which the band is mounted are actually used only to support the band and need only be of sufficient diamter to space the upper and lower lengths of the continuous band to permit the passage of a log or other workpiece being cut. A pair of 24 inch diameter pulleys, for example, may pass up to a 20 inch diameter log. The smaller pulleys permitted by the present invention result in lower rotational inertia during operation, which allows the band to be quickly stopped and reversed with less force than that required for larger friction drive units. This is particularly advantageous and suitable for saws in which the band carries reversible self-sharpening teeth.

Linear induction motors may be applied with equivalent advantages to saws and woodworking cutters of practically any size including the smaller finishing equipment used in mill work. This type of drive further lends itself ideally to direct drive of the band at speeds on the order of 8000 feet per minute or more, using three-phase electric power.

While the band saw of the present invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A linear motor driven band saw comprising a continuous, electrically conductive band carrying a plurality of cutting teeth along at least one edge,
   a pair of spaced support pulleys about which the band is mounted for continuous motion, and
   a linear induction motor for supplying power to drive the band saw, said motor comprising a stationary induction field system as the primary driving element of the motor, which stationary induction field system is mounted in operative relation to the band to drive it about the pulleys, and the band itself as the secondary driven element of the linear induction motor, said band being driven directly by induction forces established in the stationary induction field system.

2. The band saw of claim 1 wherein the stationary induction field system comprises a pair of field structures opposingly mounted so as to provide an air gap therebetween through which the conductive band carrying cutting teeth is driven by fields induced across said field structures.

3. The band saw of claim 1 wherein the stationary induction field system, support pulleys and band carrying cutting teeth are mounted on a carriage which may be propelled along a stationary workpiece which is to be cut.

4. The band saw of claim 1 wherein the band carries cutting teeth along both edges so that it may cut when either the band or work piece are moved relative to one another in either of opposite directions.

5. The band saw of claim 1 wherein the band is composed of a beryllium copper alloy.

6. The band saw of claim 5 wherein the cutting teeth carried by the band are formed of a high temperature alloy having significant work-hardening properties.

7. The band saw of claim 1 wherein the stationary induction field system is operable from electric current having an alternating frequency higher than 60 cycles per second.

8. The band saw of claim 1 wherein the stationary induction field system comprises a plurality of poles, groups of which may be sequentially energized by multi-phased electrical current, which groups are connected in parallel with other such groups.

9. The band saw of claim 8 wherein the phase of certain poles may be interchanged with others to reverse the direction of motion of the band.

10. The band saw of claim 1 further comprising tension means, for adjusting and maintaining tension in the band, comprising adjustable expansion means interposed between the support pulleys to urge them in opposing directions.

11. The band saw of claim 10 wherein the adjustable expansion means comprises a hydraulic jack.

12. The band saw of claim 10 further comprising a pair of pulley support frames axially supporting the pulleys, at least one of said frames being movable toward and away from the other and said tension means being operatively connected to said frames to urge them apart, thereby applying a tensile load to the band through the frames and pulleys.

13. The band saw of claim 10 in which the tension means further comprises spring means interposed in series with the adjustable expansion means.

* * * * *